Patented Jan. 3, 1950

2,493,550

UNITED STATES PATENT OFFICE 2,493,550

PREPARATION OF BASIC LEAD SALTS OF 2:4 DINITRO RESORCINOL

Leon Rubenstein, Saltcoats, Scotland, assignor to Imperial Chemical Industries Limited, a corporation of Great Britain No Drawing. Application July 8, 1947, Serial No. 759,704
In Great Britain September 4, 1946

4 Claims. (Cl. 260—435)

The present invention is concerned with an improved process for the manufacture of substantially monobasic lead salts of 2:4 dinitroresorcinol and has for its object to provide substantially monobasic lead salts of 2:4 dinitroresorcinol in a condition of improved suitability for use in electric fuseheads and similar electric igniters.

The basic lead salts of polynitro phenolic compounds are made by a double decomposition reaction, usually carried out at substantially raised temperatures, between a solution of a soluble normal lead salt, e. g. lead nitrate, and a solution of the polynitro phenolic compound containing an excess of a soluble base, all in molecular quantities corresponding to the basicity of the basic lead salt required. The composition of the basic lead salts of polynitro phenolic compounds, however, is liable to vary considerably in accordance with the conditions under which they are prepared, and the product that is precipitated as a result of the interaction between the solutions used frequently comprises a mixture of chemical individuals of varying basicities, while marked variations in quality are often experienced even when the lead contents of the preparations of any particular basic lead salt of a polynitro phenolic compound prepared under the differing conditions are the same. The lead contents of the basic lead salts obtained when even slight variations are made in the method of preparation are liable to differ quite appreciably, but variations in the requisite properties may occur even if the lead contents are the same, while on the other hand products of appreciably differing lead contents may be equally serviceable.

The substantially monobasic lead salts of 2:4 dinitroresorcinol as prepared by precipitation in the usual manner by the addition of a solution of 2 mols lead nitrate to a solution of 1 mol disodium salt of 2:4 dinitroresorcinol and 2 mols sodium hydroxide at raised temperature when washed free from soluble salts and dried may contain from say 59 to 69% lead, and their easy ignitability when heated and excellent deflagrating characteristics would render them very suitable for use in electric fuseheads and similar electric igniters as the ingredient in the deflagrating bead or the like directly ignitable by the electrically heated conductor. They have, however, a marked tendency to gelate nitrocellulose solutions, and since the deflagrating bead or the like is ordinarily built up by alternately applying and drying off successive coats of a suspension of the ignitable ingredient in a viscous solution of nitrocellulose in a volatile solvent, this tendency to gelate nitrocellulose solutions is a serious disadvantage.

Moreover, during the precipitation of the monobasic lead salt of 2:4 dinitroresorcinol by the aforesaid method I have observed that there is also precipitated a small amount of an inactive lead compound free from nitrogen which appears to be a possibly somewhat hydrated form of lead oxide. When the precipitation is carried out in a glass vessel this inactive lead compound tends to segregate and adhere to the base of the vessel. Although this inactive lead compound may be formed in very small amount, the amount of active ingredient required for each electric fusehead or like electric igniter is so small that the presence of even a very small amount of the inactive lead compound segregated locally in the monobasic lead salt of 2:4 dinitroresorcinol used to form fuseheads might result in a small but relatively excessive number of misfires.

We have now found that in the production of a substantially monobasic lead salt of dinitroresorcinol the precipitation of the inactive nitrogen-free lead compound and the tendency to gelate nitrocellulose solutions is obviated and a product suitable for use in fuseheads and in similar electric igniters is obtained, if in the precipitation of said substantially monobasic lead salt from an alkaline solution of 2:4 dinitroresorcinol there is present in association with the 2:4 dinitroresorcinol in the alkaline solution only from about 75% to 95% of the quantity of the soluble base used calculated for the monobasic salt and the precipitation is carried out by introduction of a stream of a solution of a soluble normal lead salt into said alkaline solution at a temperature not lower than about 70° C.

According to the present invention the process for the production of a substantially monobasic lead salt of 2:4 dinitroresorcinol in which are included the steps of forming a precipitate of this lead salt by reacting at raised temperatures a solution of a soluble normal lead salt with a solution of 2:4 dinitroresorcinol in an aqueous solution of a water soluble base and subsequently washing the precipitate thus formed free from soluble salts comprises employing in said aqueous solution a quantity of water soluble base from about 75% to 95% of the quantity calculated for the monobasic salt, and carrying out the precipitation of the substantially monobasic lead salt of 2:4 dinitroresorcinol by introducing a stream of the solution of a soluble normal lead salt into the said solution of 2:4 dinitroresorcinol at a temperature not lower than about 70° C.

Preferably no corresponding reduction is made in the amount of soluble normal lead salt used calculated to yield the monobasic lead salt of dinitroresorcinol. The soluble base is preferably sodium hydroxide and the soluble lead salt used is preferably lead nitrate.

When sodium hydroxide and lead nitrate are used there should accordingly be employed for each mol of 2:4 dinitroresorcinol from approximately 3 to 3.6 mols sodium hydroxide and 2 mols lead nitrate.

It is, of course, necessary to wash the precipitate, which assumes a reddish colour, free from soluble salts.

If desired the precipated substantially monobasic lead salt of 2:4 dinitroresorcinol may be treated with a small quantity of a diluted acid that has a soluble lead salt, as claimed in my co-pending United States application, Serial No. 759,703, filed July 8, 1947, preferably by adding a dilute solution of the acid to the suspension obtained by the introduction of the soluble normal lead salt into the alkaline solution of the 2:4 dinitroresorcinol as an additional safeguard against the product having any tendency to gelate nitrocellulose solutions.

The invention is illustrated by the following examples:

Example I 20 gm. (1 mol) 2:4 dinitroresorcinol are dissolved in 360 c. c. N/1 sodium hydroxide solution (3.6 mols) and 440 c. c. water. The solution is filtered and heated to 75° C. While the hot solution is kept stirred in a glass vessel there are added to it at a constant rate over a period of 12 minutes 660 c. c. of a filtered solution containing 100 gm. lead nitrate per litre (2 mols). During this addition the vessel is kept externally heated so that the temperature of the mixture is maintained slightly above 70° C. When the precipitate first appears it is orange yellow in colour but it gradually changes until it has a reddish colour towards the end of the lead nitrate addition. It settles readily. The mixture is cooled to room temperature and the supernatant liquor is decanted off. No appreciable appearance of the yellowish inactive insoluble lead compound on the base of the vessel is manifested. The remaining slurry is filtered and washed with hot water until free from soluble salts, and then washed with acetone to remove the water and finally with amyl acetate. The lead content of a dried sample of the substantially monobasic lead salt so prepared is about 61%. The material when incorporated into a nitrocellulose solution in amyl acetate in known manner does not gelate the solution on standing for a week. Low tension fuseheads made from the resulting suspension of this substantially monobasic lead salt of the dinitroresorcinol are satisfactorily reliable in action and the current required to fire them is slightly less than is required to fire similar fuseheads made in similar fashion in which lead 2-mononitro resorcinate is substituted for the said substantially monobasic lead salt.

Example II

The procedure is the same as in Example I except that the quantities of the reagents used are 10 gm. 2:4 dinitroresorcinol (1 mol), 190 c. c. N/1 sodium hydroxide solution (3.8 mol), 210 c. c. water and 330 c. c. lead nitrate solution (100 gm. per litre) (2 mol). The dried substantially monobasic lead salt has a lead content of 63.1% but is similar in its properties to the product of Example I. No appreciable evidence of the precipitation of the yellowish inactive lead compound is observed.

In a comparative experiment, not in accordance with the present invention, wherein the quantities of sodium hydroxide solution is increased to 200 c. c. (4 mols) and the amount of water decreased to 200 c. c., the conditions being otherwise the same, about 1 decigram of the yellowish inactive nitrogen-free lead compound is found adhering to the base of precipitating vessel and although care is taken not to include this adherent deposit in transferring the substantially monobasic lead salt of 2:4 dinitroresorcinol to the filter, the final product gelates the solution of nitrocellulose in amyl acetate while being mixed into it. The lead content is 64%.

I claim:

1. A process for the production of a substantially monobasic lead salt of 2:4 dinitroresorcinol in which are included the steps of forming a precipitate of this lead salt by reacting at a raised temperature a solution of a soluble normal lead salt with a solution of 2:4 dinitroresorcinol in an aqueous solution of an inorganic water soluble base wherein the amount of soluble normal lead salt used is substantially that calculated to yield the monobasic lead salt of 2:4 dinitroresorcinol and which comprises employing in said aqueous solution a quantity of the inorganic water soluble base from about 75 to 95 per cent of the quantity calculated for the monobasic salt and carrying out the precipitation of the substantially monobasic lead salt of 2:4 dinitroresorcinol by introducing a stream of the solution of a soluble normal lead salt into the said solution of 2:4 dinitroresorcinol at a temperature not lower than about 70° C.

2. A process as claimed in claim 1 wherein the inorganic water soluble base is sodium hydroxide.

3. A process as claimed in claim 1 wherein the soluble lead salt is lead nitrate.

4. process for the production of a substantially monobasic lead salt of 2:4 dinitroresorcinol in which a precipitate of said lead salt is formed by adding in the form of a stream a solution containing substantially 2 mols. of lead nitrate to an aqueous solution whose temperature is maintained not lower than about 70° C. and which contains from 3 to 3.8 mols. of sodium hydroxide and 1 mol. of 2:4 dinitroresorcinol.

LEON RUBENSTEIN.

REFERENCES CITED

The following references are of record in the file of this patent:

UNITED STATES PATENTS

| Number | Name | Date |
| --- | --- | --- |
| 1,999,728 | Herz | Apr. 30, 1935 |
| 2,116,514 | Hale et al. | May 10, 1938 |
| 2,177,657 | Kerone et al. | Oct. 31, 1939 |
| 2,226,391 | Rubenstein | Dec. 24, 1940 |

FOREIGN PATENTS

| Number | Country | Date |
| --- | --- | --- |
| 192,830 | Great Britain | Feb. 15, 1923 |